US009250012B2

(12) United States Patent
    Baxter

(10) Patent No.: US 9,250,012 B2
(45) Date of Patent: Feb. 2, 2016

(54) METHODS AND SYSTEMS FOR SEPARATING CONDENSABLE VAPORS FROM GASES

(71) Applicant: Larry L. Baxter, Provo, UT (US)

(72) Inventor: Larry L. Baxter, Provo, UT (US)

(73) Assignee: SUSTAINABLE ENERGY SOLUTIONS, LLC, Orem, UT (US)

( * ) Notice: Subject to any disclaimer, the term of this patent is extended or adjusted under 35 U.S.C. 154(b) by 0 days.

(21) Appl. No.: 14/204,882

(22) Filed: Mar. 11, 2014

(65) Prior Publication Data

US 2014/0298856 A1   Oct. 9, 2014

Related U.S. Application Data

(62) Division of application No. 13/257,261, filed as application No. PCT/US2010/027518 on Mar. 16, 2010, now Pat. No. 8,715,401.

(60) Provisional application No. 61/181,655, filed on May 27, 2009, provisional application No. 61/210,298, filed on Mar. 16, 2009.

(51) Int. Cl.
    *B01D 53/02*   (2006.01)
    *F25J 1/00*    (2006.01)
    *B01D 7/02*    (2006.01)
    (Continued)

(52) U.S. Cl.
    CPC ............. *F25J 1/0027* (2013.01); *B01D 7/02* (2013.01); *B01D 53/002* (2013.01); *F01N 3/005* (2013.01); *B01D 2257/302* (2013.01); *B01D 2257/404* (2013.01); *B01D 2257/504* (2013.01); *B01D 2257/80* (2013.01); *C01B 31/22* (2013.01); *F23J 2219/70* (2013.01); *F23J 2900/15061* (2013.01); *Y02C 10/04* (2013.01); *Y02C 10/08* (2013.01); *Y02T 10/20* (2013.01)

(58) Field of Classification Search
    CPC ................. B01D 2257/302; B01D 2257/404; B01D 2257/504; B01D 2257/80; B01D 53/002; B01D 7/02; C01B 31/22; F01N 3/005; F23J 2219/70; F23J 2900/15061; F25J 1/0027; Y02C 10/04; Y02C 10/08; Y02T 10/20
    See application file for complete search history.

(56) References Cited

U.S. PATENT DOCUMENTS 2,966,037 A * 12/1960 Gifford ........................... 62/637
3,023,836 A *  3/1962 Kasbohm et al. ............... 95/111
(Continued)

FOREIGN PATENT DOCUMENTS

CN    1126630 CN    7/1996
CN    1476346 CN    2/2004
WO    WO2008004321  1/2008

OTHER PUBLICATIONS

Chinese Office Action, 201080021604.4, dated Jul. 25, 2013.
(Continued)

*Primary Examiner* — Christopher P Jones
(74) *Attorney, Agent, or Firm* — Workman Nydegger

(57) ABSTRACT

Condensable vapors such as carbon dioxide are separated from light gases in a process stream. The systems and methods employ a particle bed cooled by an in-bed heat exchanger to desublimate the condensable vapors from the process stream. The condensable vapors are condensed on the bed particles while the light gases from the process stream, which are not condensed, form a separated light-gas stream. The separated light-gas stream can be used in a recuperative heat exchanger to cool the process stream.

22 Claims, 4 Drawing Sheets

(51) Int. Cl.
 B01D 53/00 (2006.01)
 F01N 3/00 (2006.01)
 C01B 31/22 (2006.01)

(56) References Cited

U.S. PATENT DOCUMENTS

| | | | | |
|---|---|---|---|---|
| 3,977,846 | A | * | 8/1976 | Russell et al. .................. 95/108 |
| 4,478,600 | A | * | 10/1984 | Schoener et al. ......... 23/313 FB |
| 4,528,002 | A | * | 7/1985 | Linde ............................... 95/174 |
| 4,702,818 | A | * | 10/1987 | Oyamoto et al. ............... 208/81 |
| 4,769,054 | A | | 9/1988 | Steigman |
| 5,344,473 | A | * | 9/1994 | Szolgyenyi et al. ............ 96/323 |
| 5,567,228 | A | * | 10/1996 | Abdulally ....................... 95/109 |
| 6,383,257 | B1 | * | 5/2002 | McDermott et al. .............. 95/41 |
| 8,715,401 | B2 | | 5/2014 | Baxter |
| 2002/0189443 | A1 | | 12/2002 | McGuire |
| 2004/0148961 | A1 | | 8/2004 | Clodic |
| 2007/0114488 | A1 | * | 5/2007 | Jackson .......................... 252/71 |
| 2007/0277674 | A1 | | 12/2007 | Hirano |
| 2008/0302133 | A1 | | 12/2008 | Saysset |
| 2009/0173073 | A1 | * | 7/2009 | Guidati et al. .................. 60/670 |
| 2010/0162752 | A1 | * | 7/2010 | Tabata et al. ................... 62/606 |

OTHER PUBLICATIONS

U.S. Appl. No. 13/257,261, filed Dec. 27, 2011, Office Action dated Dec. 16, 2013.

* cited by examiner

METHODS AND SYSTEMS FOR SEPARATING CONDENSABLE VAPORS FROM GASES

CROSS REFERENCE TO RELATED APPLICATIONS

This application is a division of U.S. patent application Ser. No. 13/257,261, filed Sep. 16, 2011, which is a 371 Application of PCT/US10/27518 filed Mar. 16, 2010, which claims the benefit of U.S. Provisional Application No. 61/210,298, filed Mar. 16, 2009, and U.S. Provisional Application No. 61/181,655 filed May 27, 2009. The disclosures of the foregoing applications are incorporated herein in their entirety.

BACKGROUND

1. The Field of the Invention

The present invention relates to methods and systems for separating desublimating vapors (e.g., carbon dioxide) from gases by desublimating the vapors on a bed of particles.

2. The Related Technology

The separation of carbon dioxide from other light gases such as nitrogen is important for achieving carbon dioxide separation. The flue gases of a conventional power station typically contain from about 4% (by volume) to about 14% carbon dioxide ($CO_2$). $CO_2$ may represent a significant to climate change. Therefore, there is a clear need for efficient methods of capturing $CO_2$ from flue gases so as to produce a concentrated stream of $CO_2$ that can readily be transported to a safe storage site or to a further application. $CO_2$ has been or is planned to be captured from gas streams by five main technologies: absorption, where $CO_2$ is selectively absorbed into liquid solvents; adsorption or chemical looping, where $CO_2$ is separated by adsorption or reaction on the surfaces of specially designed solid particles which may or may not be induced to release the $CO_2$ into substantially pure streams later in the process; membranes, where $CO_2$ is separated by semi-permeable plastics or ceramic membranes; oxyfiring, where oxygen is separated from air prior to combustion, producing a substantially pure $CO_2$ effluent; and, low temperature/high pressure processes, where the separation is achieved by condensing the $CO_2$.

The currently most well-established and therefore economical proven technique to capture $CO_2$ from a flue gas is to scrub the flue gas with an amine solution to absorb $CO_2$ to the solution. This technology has reached the commercial state of operation for $CO_2$ capture systems from small scale flue gases and from specialty processes. However, its application decreases considerably the total efficiency of the power plant.

Another type of process that has received significant attention is the oxy-combustion systems, which uses oxygen, usually produced in an air separation unit (ASU) but sometimes in membrane separation units, instead of air, for the combustion of the primary fuel. The oxygen is often mixed with an inert gas, such as recirculated flue gas, to keep the combustion temperature and heat absorption at a suitable level. Oxycombustion processes produce flue gas having $CO_2$, water and $O_2$ as its main constituents; the $CO_2$ concentration being typically greater than about 70% by volume. Treatment of the flue gas is often needed to remove air pollutants and non-condensed gases (such as nitrogen) from the flue gas before the $CO_2$ is sent to storage.

BRIEF SUMMARY

The present disclosure describes methods and systems for separating desublimating vapors (e.g., carbon dioxide) from other gases (e.g., nitrogen) in a continuous separation process. The separation process is carried out in a fluidized or fixed bed having an in-bed heat exchanger. The in-bed heat exchanger cools the bed and/or the process stream flowing through the bed. As the process stream is cooled, the condensable vapors condense, thereby forming a condensed phase on the surface of the bed particles and/or the exterior heat exchanger surface. The condensation of the desublimating vapors also causes separation of the vapors from other gases in the process stream, thereby forming a separated light-gas stream.

Condensed solids such as, but not limited to, carbon dioxide, oxides of sulfur, oxides of nitrogen, and water, can be melted to form a liquid and used as products or sequestered using any suitable sequestration technique. For example, the separated carbon dioxide can be injected into an aquifer or other suitable underground reservoir.

The use of a bed of particles in the present invention provides an abundance of surface area for vapor desublimation. The bed of particles improves the efficiency of the system by minimizing the amount of desublimation that occurs on the heat exchanger surface as a total percentage of desublimation vapors. In one embodiment, the bed can be fluidized. In this embodiment, the fluidized particles can impinge the exterior surface of the conduit of the heat exchanger to reduce a buildup of condensed solids, thereby further improving the efficiency of the heat exchanger and allowing for continuous operation of the system.

In one embodiment, the system includes a separation vessel having a process stream inlet and a light gas outlet. The process stream inlet is in fluid communication with a process stream that includes condensable vapors. A bed of particles is placed within the separation vessel. The bed of particles is in fluid communication with the process stream and the process stream has sufficient pressure to flow through the bed of particles. An in-bed heat exchanger includes one or more heat exchanger surfaces that are at least partially submerged in the bed of particles. The temperature and pressure within the bed may be sufficient to desublimate at least a portion of the condensable vapors from the process stream onto the bed of particles and/or onto an exterior of the conduit of the in-bed heat exchanger. The condensed vapors form a condensed solid, which is thereby separated from light gases in the process stream that exit the vessel as a separated light gas stream.

The bed of particles can include any type of particulate. In one embodiment, the bed of particles includes particles of the desublimated solid. For example, where carbon dioxide is to be separated from a process stream, the bed of particles can include particles of solid carbon dioxide. The particles can also include other non-condensable materials such as inorganics (silica, oxides, carbonates, etc.) to improve the uniformity of particle sizes in the bed. However, heterogeneous particles are not required.

During desublimation, the condensation of the vapors on the particles in the bed and/or the conduit causes a buildup of mass in the bed. Solids can be removed from the vessel to maintain a desired bed volume and/or particle size. In one embodiment, particles are removed from a bottom portion of the bed where larger particles tend to accumulate. Removing condensed solids by removing particles from the bed can be used to facilitate continuous operation of the system.

The systems and methods described herein may be carried out at any temperature and pressure suitable for desublimating condensable vapors in a process stream. In one embodiment, the pressure in the vessel can be relatively low, such as a pressure in a range from about ambient pressure to about 15 psi or ambient to about 10 psi, or ambient to about 5 psi. In an alternative embodiment, the pressure can be relatively high such as in a range from about 5 psi to about 1000 psi or greater or 20 psi to about 500 psi. Where carbon dioxide is to be desublimated, the temperature and pressure within the bed of particles are selected for transforming gaseous carbon dioxide directly to solid carbon dioxide. The temperatures and pressures for desublimating carbon dioxide are well-known. For example, at ambient pressure, carbon dioxide vapors desublimate at a temperature of less than about −78° C.

In one embodiment, the separation unit (i.e., separation vessel, particle bed, and in-bed heat exchanger) can be operated at high pressure such that the exiting light gas stream can be further cooled for use as the cooling gas in the in-bed heat exchanger. In one embodiment, a separated light gas stream having a pressure greater than about 5 psi, greater than about 20 psi, or greater than about 50 psi is expanded to cool the separated light gas stream to a temperature that is below the temperature of the bed of particles in the separation vessel. This additional cooling of the separated light gas stream can cause desublimation of a residual portion of condensable vapors in the separated light gas stream. A solids separation apparatus can be used to remove solids that form in the expansion of the separated light gas stream. The cooled separated light gas stream can then be transferred through an interior of the conduits that traverse the bed of particles, thereby drawing heat from the bed of particles.

In an alternative embodiment, the in-bed heat exchanger can be cooled using means other than the separated light gas stream. In one embodiment, the in-bed heat exchanger can include a refrigeration unit. In this embodiment, any refrigeration system can be used that is capable of achieving the desired temperatures and heat removal rates for cooling the bed of particles.

The systems and methods described herein can also include cooling steps carried out upstream from the separation unit. Prior to introducing the process stream into the vessel, the process stream is typically cooled using one or more heat exchangers. In the initial cooling process, the process stream can be dried to remove water. In one embodiment, the process stream is cooled using one or more recuperative heat exchangers, which cool the process stream using the separated light gas stream. The separated light gas stream can be used in the heat recovery exchangers directly downstream from the separation vessel, or alternatively, the separated light gas stream can be used in the recuperative heat exchangers downstream from an expansion device and the in-bed heat exchanger as described above.

In one embodiment a method for separating condensable vapors from gases to form a solid includes all or a portion of the following steps: (i) providing a process stream that includes condensable vapors; (ii) cooling the process stream using one or more up-stream heat exchangers; (iii) providing a separation unit including, a vessel having a process stream inlet and a light gas outlet; a bed of particles; and an in-bed heat exchanger having one or more conduits that are at least partially submerged in the bed of particles; (iv) introducing the process stream into the separation unit downstream from the one or more up-stream heat exchangers and causing the process stream to flow through the bed of particles; (v) cooling the bed of particles using the in-bed heat exchanger under a temperature and pressure sufficient to cause at least a portion of the condensable vapors in the process stream to desublimate from the process stream onto the bed of particles and/or onto an exterior of the conduit of the in-bed heat exchanger so as to form a condensed solid and a separated light gas stream; and (vi) removing the separated light gas stream from the vessel through the light gas outlet.

In one embodiment, the method includes using a process stream that includes carbon dioxide and operating the separation unit at a temperature and pressure suitable for desublimating carbon dioxide.

The method can also include fluidizing the bed of particles. In one embodiment, the separation unit can be operated in a steady state in which a rate of buildup of condensed solid on the exterior of the conduit is about the same as a rate of removal of condensed solids therefrom. The steady state can be provided by configuring the impingement of the particles on the conduit to remove the buildup of condensed solid on the conduit at about the same rate that the buildup occurs and/or removing solids from the bed to maintain a bed volume within a desired range.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

The systems and methods disclosed herein relate to separating condensable vapors from a process stream (e.g., the flue gas from a power plant) to form a solid and a separated light gas stream. For example, in one embodiment, the methods and systems relate to condensing carbon dioxide vapors from a process stream that includes carbon dioxide and nitrogen. The systems and methods employ a particle bed cooled by an in-bed heat exchanger to desublimate the condensable vapors. The vapors are condensed on the bed particles to form a solid or adsorbed liquid while the lighter gases, which are not condensed, form a separated light-gas stream. The condensed vapors can be used in any desired way. For example, where the condensed vapors are carbon dioxide, the solid carbon dioxide can then be melted and sequestered using any suitable sequestration technique.

The systems and methods of the invention can be used to separate condensable vapors in any process stream that includes a mixture of gasses, some of which can be readily caused to change phase. The process stream is typically produced in a hydrocarbon processing plant. Examples of hydrocarbon processing plants that produce a process stream suitable for use in the present invention include, but are not limited to coal fired power plants, a natural gas fired power plants, and/or fuel oil fired power plants. While the present invention is particularly advantageous for use with process streams from power plants, the invention can also be used with other industrial process streams, such as, but not limited to process streams from petroleum refining.

I. Systems for Condensing Vapors

Figure 1:
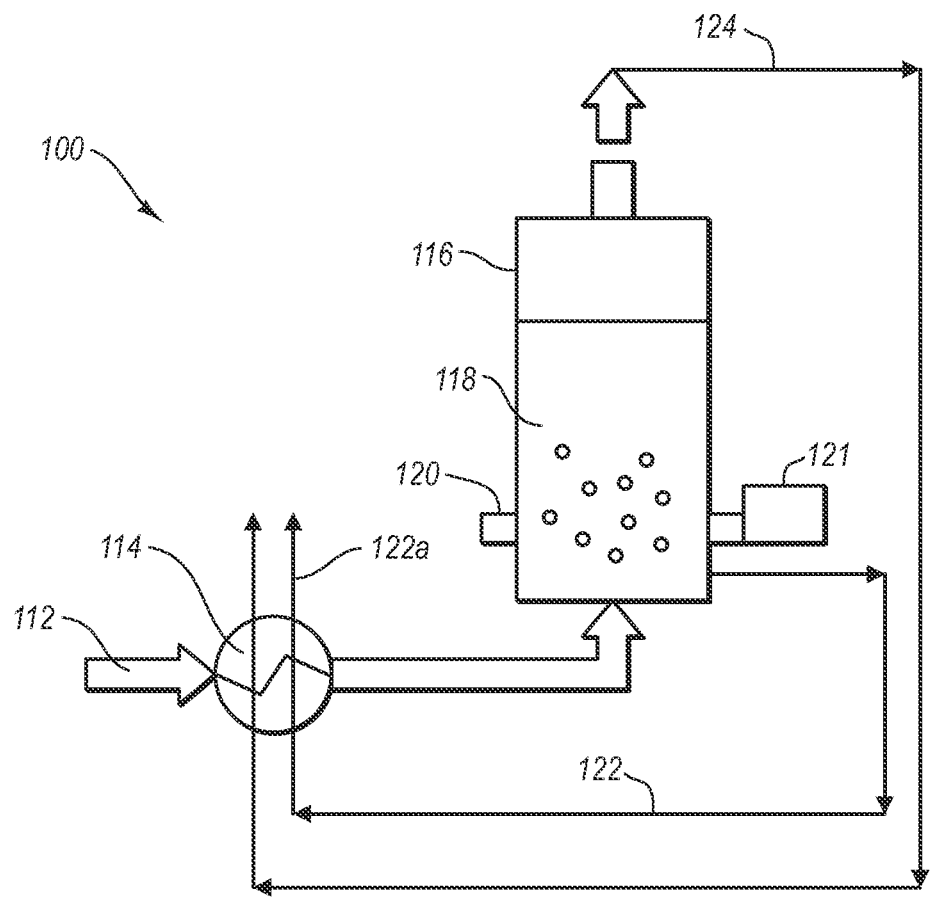
FIG. 1 is a schematic diagram of a system for separating condensable vapors from gases.

FIG. 1 is a schematic diagram of an illustrative system 100 for separating condensable vapors from gases. System 100 includes a process stream 112 in fluid communication with a recuperative heat exchanger unit 114. Recuperative heat exchanger unit 114 cools the process stream to a temperature near the condensation point of condensable vapors present in the process stream 112. The process stream 112 flows to a particle bed vessel 116 that includes a particle bed 118 and an in-bed heat exchanger 120. A coolant from external refrigeration unit 121 cools heat exchanger 120, which cools particle bed 118 to a temperature below the condensation point of the condensable vapors present in the process stream 112. As the vapors flow over the particle bed 118, the vapors condense on the particles to form a solid. During condensation, the condensable vapors separate from other gases in stream 112, thereby forming light-gas stream 124.

The condensed solids are removed from vessel 116 as solid-particle stream 122. Solid particle stream 122 is optionally melted in recuperative heat exchanger unit 114 to provide cooling for process stream 112. Light-gas stream 124 is used to cool process stream 112 in heat exchanger unit 114. Cooling process stream 112 using light-gas stream 124 and/or solid-particle stream 122 recovers a portion of the energy expended in cooling stream 112. This recuperative process improves the efficiency of the overall separation system 100.

Figure 2:
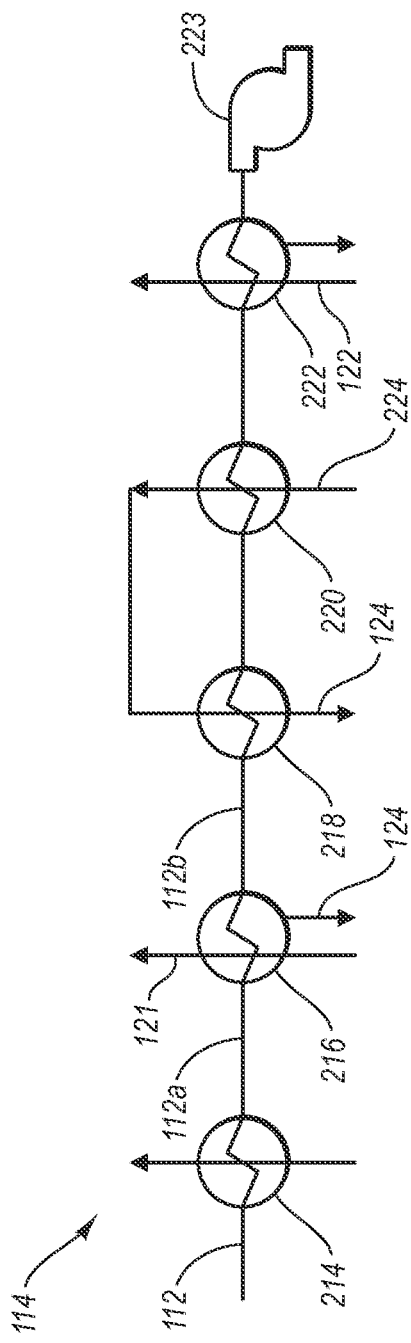
FIG. 2 is a schematic diagram of the heat exchanger for cooling a process stream upstream from a separation vessel.

Heat exchanger unit 114 can include any number of compressors, heat exchangers, fans, pumps, conduits, valves, sensors, controllers, and other components known in the art for cooling, drying, pressurizing, and/or purifying a process stream. FIG. 2 provides an illustrative example of a recuperative heat exchanger unit 114 including a plurality of heat exchangers 214, 216, 218, 220, and 222. Process stream 112 is first typically cooled to ambient temperatures using water and/or air in one or more cooling processes. For example, water 219 can be used to cool process stream 112 using techniques known in the art to produce a process stream 112a at ambient temperature. In a second heat exchanger, process stream 112a is cooled in heat exchanger 218 to condense any water vapors that may exists in process stream 112a to produce a dry process stream 112b. Process stream 112a can be cooled using any suitable coolant 121. Coolant 121 can be provided from streams 122 and/or 124 or be cooled using non-recuperative techniques known in the art, such as, but not limited to an external refrigeration unit. Second heat exchanger 216 can include a separator for removing condensed water 124.

Dry process stream 112b can be introduced into any number or any type of heat exchangers to cool the process stream to a temperature just above the condensation temperature of the condensable vapors present in the process stream (i.e., the condensable vapors to be removed through the particle bed). FIG. 2 shows the process stream 112b being introduced into a series of heat exchangers 218, 220, and 222 and then through a fan 223. Heat exchangers 218, 220, and 222 cool the process stream to a temperature just above the frost or dew point of the condensable vapors and fan 223 provides pressure for injecting the cooled process stream into separation vessel 116.

In one embodiment, cold separated light-gas stream 124 flows through heat exchangers 218 and 220 as a coolant. In heat exchangers 218 and 220, cold separated light-gas stream 224 may flow counter to the flow of the process stream 112b such that the colder portion (i.e. upstream portions) of stream 124 are in thermal contact with the colder (i.e. downstream portions) of stream 124.

Flowing the light gas stream 124 counter to the flow of dry process stream 112b can be done through multiple heat exchangers using any number of heat exchangers necessary to achieve a desired cooling efficiency. Alternatively, or in addition to using multiple heat exchangers, the light-gas stream 124 and the process stream 112b can have counter flow within a single heat exchanger. For example, heat exchangers that include conduits with parallel flow for the process stream 112b and the light-gas stream 124 can include a counter directional flow. Counter flow can be beneficial to ensure that the coldest portion of the light gas stream 124 comes into contact with the coldest dry process stream 112b, which enables the coldest temperatures to be achieved for process stream 112b using the light-gas stream 124 as the coolant.

Using the cold separated light-gas stream 124 as the coolant in heat exchanger unit 114 recuperates energy expended in cooling the gasses to form the light-gas stream 124. Because the laws of thermodynamics prevent any closed system from achieving 100% efficiency, additional cooling of process stream 112 is needed at some point in system 100 to achieve the desired low temperature for condensing the vapors. If needed, a portion of the external cooling can be provided prior to vessel 116 to achieve the desired temperature for process stream 112 at the input of vessel 116.

Recuperative heat exchanger unit 114 can also include one or more heat exchanger for utilizing solid-particle stream 122 to cool process stream 112. Process stream 122 can be melted and/or heated using process stream 112 to produce a melted $CO_2$ stream, which results in cooling process stream 112.

In an illustrative embodiment, heat exchanger 222 cools process stream 112 downstream from heat exchanger 220 to produce $CO_2$ stream 112a. In an alternative embodiment, particle stream 122 can be used in a heat exchanger upstream or downstream from recuperative heat exchangers using light gas stream 124 as a coolant (e.g., heat exchangers 218 and 220). Stream 122 can also be used in any number of heat exchangers to provide a desired cooling efficiency.

Recuperative heat exchanger unit 114 can also be configured to remove one or more different types of impurities prior to vessel 116. Impurities are often found in the process streams as a consequence of using natural products such as coal and petroleum to produce the process stream. In one embodiment, the process stream can include, but is not limited to, mercury, NOx, SOx, combinations of these, and any other impurities known to be present in industrial process streams.

The impurities can be removed by condensing the impurity in a heat exchanger at a desired temperature and pressure. Any number of heat exchangers and/or compressors, and/or separation devices can be used to condense the impure vapors and separate them from process stream 112b to produce a purified dry process stream. The coolant used in the heat exchanger can be a separated light gas stream 124, a condensed $CO_2$ stream (e.g., stream 122) or a coolant from an external refrigeration unit or device of comparable functionality. The separation of the impurities is carried out by selecting a proper temperature and pressure at which the impurity will condense and the other condensable vapors (e.g., $CO_2$) do not condense. Those skilled in the art are familiar with the temperatures and pressures needed to condense impurities typically found in a process stream. These impurities include but are not limited to oxides of sulfur and nitrogen ($SO_2$, $SO_3$, NO, $NO_2$), water at sub-freezing temperatures, halogenated gases (HCl, $HgCl_x$) mercury, arsenic compounds, and other impurities common to flue gases and of operational, health, or environmental concern. Generally, these compounds desublimate when temperatures of particles or surfaces are at or below the freezing points of these compounds. Typical freezing points for compounds of relevance are provided in Table 1 below.

TABLE 1

| Compound | Freezing Point (° C.) |
| --- | --- |
| SULFUR DIOXIDE | −73.15 |
| SULFUR TRIOXIDE | 16.8 |
| CARBON DIOXIDE | −56.57 |
| WATER | 0.00 |
| NITROGEN DIOXIDE | −11.25 |
| NITRIC OXIDE | −161.0 |

Figure 3:
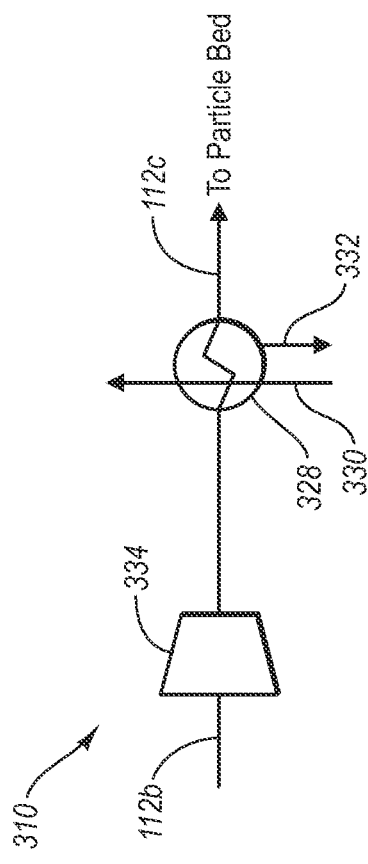
FIG. 3 is a schematic diagram of a heat exchanger for removing impurities from a process stream upstream from a separation vessel.

FIG. 3 illustrates a subsystem 210 of system 100 that can be used to remove impurities. Subsystem 310 includes conduit for carrying process stream 112b, which can be coupled to an optional compressor 334 and a heat exchanger/separator 328. Compressor 334 optionally compresses dry process stream 112b to a desired pressure for condensing the impurities in stream 112b. A coolant 330 is used in heat exchanger 328 to cool dry process stream 112b to a temperature suitable for condensing one or more impurities to form a liquid impurities stream 332. The liquid impurities stream is withdrawn from heat exchanger/separator 328 to produce a purified process stream 112c. Purified process stream 112c can then be further processed to remove additional impurities, cooled to a colder temperature, and/or introduced into vessel 116. Liquid impurities stream 332 can be further processed into desirable products and/or disposed of and/or used to cool process stream 112 upstream from being separated (i.e., in a recuperative heat exchanger process).

The impurities can be condensed and removed from process stream 112b prior to vessel 116 to minimize the concentration of impurities in the solid-particle stream 122, which will typically be sequestered, and minimize the concentration of impurities in separated light gas stream 124, which will typically be vented to the atmosphere.

In one embodiment, system 100 can include one or more compressors upstream from vessel 116. The use of compressors can reduce the volume of the process stream, thereby making it easier to handle large flows. The number of compressors and heat exchangers can depend in part on the desired operating pressure of the separation system 100. Where ambient pressure or relatively low pressure (e.g., ambient to 10 psi) is desired, one compressor or even just a fan pump can be sufficient for maintaining pressure. Where high pressure (e.g., tens of psi to hundreds of psi) is desired, up to hundreds of compressors and heat exchangers can be used in recuperative heat exchanger unit 114. A staged compressor/heat exchanger system for high pressure improves the efficiency of cooling and compressing the process stream.

In one embodiment, the pressure in the vessel can be relatively low, such as a pressure in a range from about ambient pressure to about 15 psi or ambient to about 10 psi, or ambient to about 5 psi. In an alternative embodiment, the pressure can be relatively high such as in a range from about 5 psi to about 1000 psi or greater or 20 psi to about 500 psi.

FIGS. 2 and 3 illustrate examples of embodiments where process stream 112 is purified, cooled, and pressured for introduction into particle bed vessel 116. Those skilled in the art will recognize that the particular equipment and order within the process stream can vary from that described in FIGS. 2 and 3 while still performing perform the functions useful for the systems of the invention.

Figure 4A:
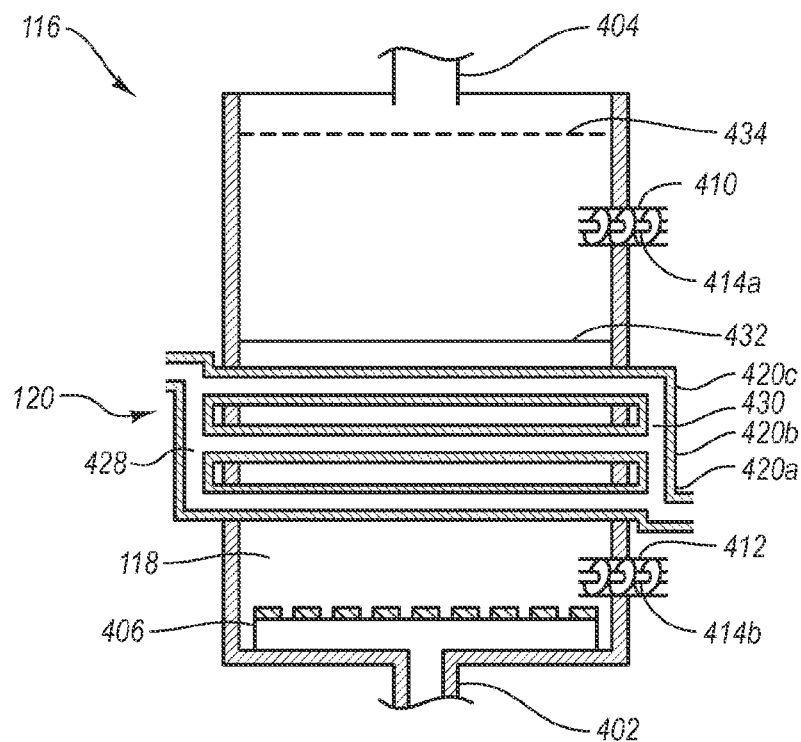
FIG. 4A illustrates a separation vessel of the system of FIG. 1.

FIG. 4A illustrates one embodiment of a particle-bed vessel 116 in additional detail. Vessel 116 includes a particle bed 118 and an in bed heat exchanger 120. Vessel 116 is sized and configured to hold a bed of particles having a suitable volume for handling the volume of process stream to be treated. Typically vessel 16 size varies in proportion to the volumetric flow rates of the gas stream, which vary widely from one application to another. Sizes of relevance to this technology range from 1 cm to many meters or tens of meters. However, the diameter can vary depending on the number of vessels and the volume of process stream being treated. In one embodiment, the diameter of the vessel can be in a range from about 1 m to about 50 m or about 3 m to about 20 m.

Vessel 116 can have any shape suitable for accommodating a particle bed and an in-bed heat exchanger. Typical shapes include columnar vessels having a rectangular or circular cross section. Vessels with a circular cross section can be advantageous where high pressure is desired.

Vessel 116 includes openings for introducing and removing gaseous components and solid components from the vessel. Vessel 16, shown in FIG. 4A, has a gaseous inlet 402 and a gaseous outlet 404. The gaseous inlet is coupled to a distribution apparatus 406. Gas introduced into gas inlet 402 is distributed through distribution apparatus 406, which serves as a manifold for delivering the volume of gas into particle bed 118.

Figure 4B:
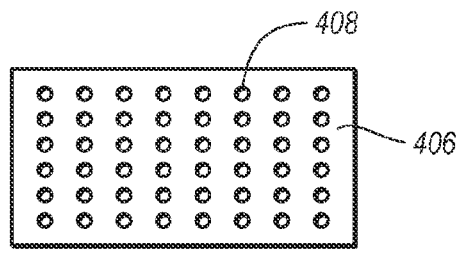
FIG. 4B illustrates a top view of a distribution plate of the separation vessel of FIG. 4A.

As shown in FIG. 4B, distribution apparatus 406 includes a plurality of nozzles 408 that provide a desired pattern and pressure for injecting the process stream into the bed 18. Any distribution apparatus with a plurality of nozzles can be used so long as the size, configuration, and spacing of the nozzles is appropriate for obtaining the distribution and pressure of process stream needed to cause the desired flow through bed 118. For example, distribution apparatus 406 can have nozzles with a diameter in a range from about 2 mm to about 5 cm with various specific designs, including sieves, bubble caps, and related designs, and included a density of nozzles in a range from about 10% coverage to about 67% coverage.

Typically the distribution apparatus 406 is positioned near the bottom of vessel 16. The gas outlet 404 is typically near the top of vessel 16 (i.e., above bed 18 during operation) such that flow of the process stream extends through bed 16.

As mentioned, vessel 16 includes a particle bed 118 onto which condensable vapors are condensed during use. Particle bed 118 is positioned within vessel 116 between gas inlet 402 and gas outlet 404 such that gas flow occurs through particle bed 118. The bed of particles can include any type of particulate. In one embodiment, the bed of particles includes particles of condensed solid. For example, where carbon dioxide is to be separated from the process stream, the bed of particles can include particles of solid carbon dioxide. The particles can also include other non-condensable materials (e.g., sand) in order to improve the uniformity of particle sizes in the bed. However, heterogeneous particles are not required.

The size of the particles in the bed are typically selected to provide a desired surface area and particle packing to achieve a desired flow of process stream through the bed and/or a desired amount of lifting of the bed by the flow of process stream (i.e., desired amount of fluidization). In one embodiment, the particle size of the bed is in a range from about 0.05 mm to about 20 mm or in a range from about 0.1 mm to about 10 mm, or about 0.2 mm to about 1 mm. Bed particle size and size distribution depends in part on the fluidization regime, gas density and velocity, and particle density.

The height of the bed 118 in vessel 116 can depend on the type of bed being used and the operating conditions of the vessel. In one embodiment, the particle bed is a fluidized bed. As explained in more detail below, the fluidized bed is made fluid by selecting a process stream flow rate and particle size to cause the particle bed to be fluidized by the flow. In this case, the bed will expand during use and a proper amount of space in vessel 116 is provided to allow the bed to expand a desired distance. FIG. 4A shows bed 118 filled to non-fluidized level 432, which is above in-bed heat exchanger 120. Level 434 shows the level that the bed reaches when the process stream gas is injected and the particles are fluidized. While FIG. 4A shows a fluidized bed, those skilled in the art will recognize that the invention can also be carried out using a fixed bed, in which case the excess volume (i.e., the volume between levels 432 and 434) are not necessary.

Vessel 16 includes a solids inlet 410 and a solids outlet 412 for adding and removing solids to and from bed 118. Typically, the solids outlet is near the bottom of the bed and the solids inlet is near the top of the vessel and/or the top of the bed 118 during use. Solid inlet 412 and/or solids outlet 414 can include augers 414a and 414b, respectively to move solids into and out of vessel 116. However, other known mechanisms for introducing and removing solids from a vessel can be used.

Figure 4C:
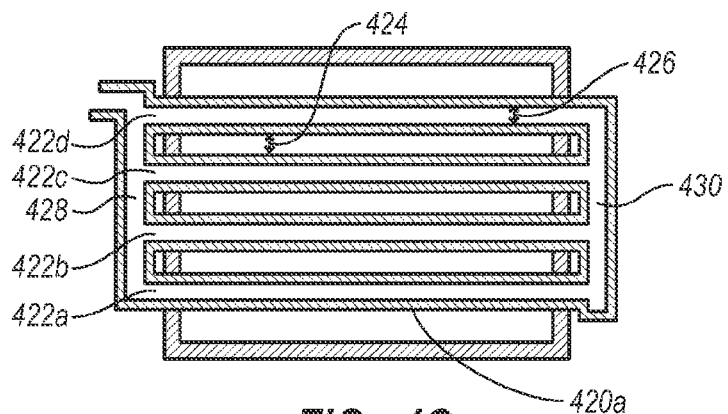
FIG. 4C is a top cross sectional view of the in-bed heat exchanger of FIG. 4A.

As mentioned above, a heat exchanger 120 is positioned within bed 118 in vessel 116. Heat exchanger 120 includes a plurality of conduits 420. The plurality of conduits 420 can be placed horizontally and vertically relative to one another. FIG. 4A shows three layers of conduits 420a, 420b, and 420c, spaced vertically. FIG. 4C is a cross section of FIG. 4A showing a horizontal placement of conduits in layer 420a. Layer 420a includes four horizontally positioned individual conduits 422a, 422b, 422c, and 422d (collectively referred to as individual conduits 422).

Individual conduits 422 and the individual conduits of layers 420b and 420c are spaced apart to provide space that allows the bed of particles 118 to fill in and contact the exterior surface of the conduits and transfer heat. The gap between individual conduits and between layers of the in-bed heat exchanger can be selected to ensure proper volume for the bed 18 and ensure proper heat transfer to the bed. In one embodiment, gap distance 424 is in a range from about 0.75 to about many heat exchanger tube diameters, although other distances can be used if desired. Examples of suitable gap distances between layers of the heat exchanger can also be in a range from about 0.75 to many heat exchanger tube diameters.

The conduit diameter 426 is typically selected in combination with the number of conduits, volume of process stream flow, particle bed size and coolant temperature to ensure adequate heat transfer for cooling the particle bed. Examples of suitable sizes include, but are not limited to, 1 cm to about 20 cm.

The shape of the plurality of conduits can be any shape that provides the desired surface area and contact for cooling the bed 118. To facilitate installation, cleaning and repair, straight tubing can be advantageous, although other designs can be used.

In one embodiment layers 420a, 420b, and 420c can be horizontally offset such that the gaps between individual conduits 422 are not aligned vertically with the gaps of one or more layers positioned above layer 420a. Heat exchanger 120 can include more or fewer layers of conduits and/or more or fewer conduits in any number of conduits so long as the desired surface area and spacing can be achieved.

The plurality of conduits of heat exchanger 120 can be supplied a coolant through inlet and outlet manifolds that distribute the coolant throughout the plurality of conduits. FIGS. 4A and 4C illustrate one configuration of an inlet manifold 428 and an outlet manifold 430. Those skilled in the art are familiar with manifolds for efficiently distributing a coolant through a plurality of conduits in a heat exchanger.

A coolant is delivered through the interior of the conduits 422 of heat exchanger 120 to cool bed 118. The coolant is selected to provide efficient cooling. The type of coolant used typically depends on the particular method for cooling the coolant. In the embodiment shown in FIG. 1, the coolant is cooled using an external refrigeration unit 121. Examples of suitable coolants for use with external refrigeration units include but are not limited to, argon, nitrogen, tetrafluromethane, ethane, carbon dioxide, 1,1-difluroethane, 1,2-difluroethane, propane, fluorinated propanes, n-butane, and iso-butane. In addition, there are many traditional refrigerants of interest that fall generally into the classification of chloroflurocarbons. Chloroflurocarbon refrigerants pose both global warming and ozone threats and may be restricted to applications in which the risk of their release to the environment is minimal. Those skilled in the art are familiar with refrigeration units that can be used to cool an in-bed heat exchanger. The heat exchanger can also be cooled using the separated light gas stream from vessel 116 (e.g., the cold nitrogen stream separated from a cold light gas stream). Examples of systems using the cold, separated light gas stream are described below with respect to FIG. 5.

Figure 5:
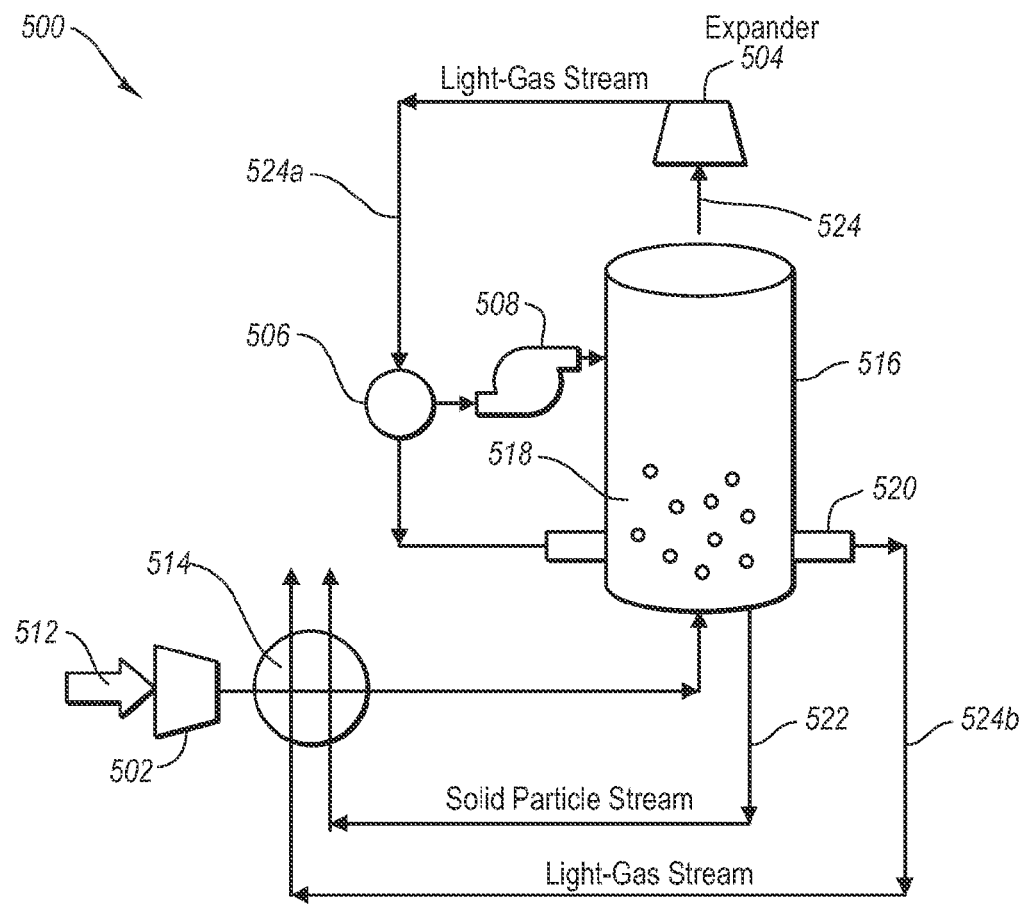
FIG. 5 is a schematic diagram of a system for separating condensable vapors from gases using elevated pressures.

FIG. 5 describes an alternative system 500 in which a separated light gas stream 524 is used as the coolant in an in-bed heat exchanger. System 500 includes a compressor 502 that pressurizes process stream 512. The pressure in process stream 512 is utilized downstream from the particle bed vessel 516 in an expansion process that cools light gas stream 524 to a temperature suitable for use in the in-bed heat exchanger 520. In one embodiment, system 500 configured to operate at a pressure substantially above ambient pressure. For example, system 500 can be operated at a pressure in a range from about 0.5 atm to about 20 atm more preferably about 1 atm to about 10 amt or about 1 atm to about 7 atm.

The expansion process utilizes an expander 504 downstream from the vessel 516. The cold separated light gas stream 524 is expanded to lower the temperature below the temperature in the bed 518. The lower temperature of expanded light gas stream 524a allows stream 524a to be used as the coolant in the in-bed heat exchanger 520, which is submersed in particle bed 518. The expansion process may be used to avoid the need to use an external refrigeration unit.

In one embodiment, a solids separator 506 can be used to remove solids that may form during the expansion of light gas stream 524 in expander 504. In some cases, light gas stream 524 may have some condensable vapors that were not separated out in vessel 516. Expanding the light gas stream 524 can cause an additional portion of the condensable vapors to form a solid. This additional condensation can remove additional amounts of $CO_2$ from system 500. The amount of solids generated from expansion of light gas stream 524 is typically small compared to the mass of solids removed in particle bed 518. The solids produced from expansion and separated using 506 can be introduced into vessel 518. To maintain pressure in vessel 508, separated solids can be pressurized using pressurizer 508 upon injection into vessel 516. In an alternative embodiment, the separated solids can be melted and used in recuperative heat exchanger unit 514 and/or mixed with solid particle stream 522.

The process stream 512 is typically pressurized upstream from vessel 516. Process stream 512 can be pressurized using any number of compressors and heat exchangers. In one embodiment, a plurality of compressors and heat exchangers alternating in series are used to compress and cool process stream 512. Using alternating compressors and heat exchangers in series can improve the efficiency of reducing the temperature and increasing the pressure. System 500 can have a vessel 516 that is similar to vessel 116 described with respect to FIGS. 4A-4C so long as vessel 516 is configured to withstand the operating pressure.

In one embodiment, the pressure within vessel 516 is at least about 5 psi, more preferably at least about 20 psi, and most preferably at least about 50 psi or even several hundred psi. Higher pressure allows for greater expansion and reduction in temperature for cooling the separated light gas stream for use as the coolant in the in-bed heat exchanger.

Operating at pressures above ambient pressure can also be advantageous for removing impurities from process stream 512 (e.g., using the structure described in FIG. 3 or a series of such equipment).

II. Methods for Condensing Vapors

The present invention includes methods for condensing vapors from a process stream using a particle bed vessel and in-bed heat exchanger. In one embodiment, the method includes (i) providing a process stream that includes condensable vapors; (ii) cooling the process stream using one or more up-stream heat exchangers; (iii) providing a separation unit including, a vessel having a process stream inlet and a light gas outlet; a bed of particles; and an in-bed heat exchanger comprising one or more conduits at least partially submerged in the bed of particles; (iv) introducing the process stream into the separation unit downstream from the one or more up-stream heat exchangers and causing the process stream to flow through the bed of particles; (v) cooling the bed of particles using the in-bed heat exchanger under a temperature and pressure sufficient to cause at least a portion of the condensable vapors in the process stream to desublimate from the process stream onto the bed of particles and/or onto an exterior of the conduit of the in-bed heat exchanger so as to form a condensed solid and a separated light gas stream; and (v) removing the separated light gas stream from the vessel through the light gas outlet.

The step of providing the process stream can include providing conduits, pumps, valves, and/or other hardware suitable for delivering a gas from a process plant to a separation unit such as system 10 or system 500 described above. The processing plant can be a hydrocarbon plant such as a coal fired, liquid fuel fired, or gas-fired power plant. Alternatively, the process stream can be a flue gas from a chemical processing plant such as a refinery. The process stream includes at least one condensable vapor. In a preferred embodiment, the condensable vapor is carbon dioxide.

The process stream is cooled to a temperature just above the dew point or frost point of the condensable vapor. The dew point or frost point of the condensable vapor depends on the particular condensable vapor and the pressure of the system. For example, the frost point of carbon dioxide at near ambient pressures is about −78° C. Those skilled in the art are familiar with calculating the frost or due point of various condensable vapors in the process stream. The process stream can be cooled to within about 10 degrees Celcius of the dew point or frost point of the condensable vapor, more preferably about 5, and most preferably within about 2. Cooling the process stream can be carried out using any technique, including those described above with regard to system 10 or system 500. For example, the methods can include drying the process stream by removing water and/or removing impurities from the process stream.

In one embodiment, process stream 512 is purified prior to being introduced into vessel by condensation in one or more heat exchangers. Impurities that can be removed by condensation include, but are not limited mercury, $NO_x$, and/or $SO_x$. In one embodiment, the purified process stream can have less than about 1 ppm mercury, less than about 1 ppm sulfur, and less than about 1 ppm oxides of nitrogen except NO, which can exist at much higher concentrations because of its high volatility even at low temperatures. In embodiment, the total trace pollutants is less than about 1 ppm.

Additional details regarding systems and methods for cooling and/or purifying a process stream can be found in Applicants co-pending PCT application serial number PCT US2008/085075, which is hereby incorporated by reference.

The method includes the step of introducing the cooled process stream into a particle bed under conditions suitable for condensing the condensable vapors onto a solid surface. The separation unit can include a particle bed disposed in a vessel such as vessel 116 or vessel 516, described above with respect to FIGS. 1-5.

In one embodiment, the pressure in the vessel can be relatively low, such as a pressure in a range from about ambient pressure to about 15 psi or ambient to about 10 psi, or ambient to about 5 psi. In an alternative embodiment, the pressure can be relatively high such as in a range from about 5 psi to about 1000 psi or greater or 20 psi to about 500 psi. The desired pressure within the vessel can be provided using one or more compressors and/or fans upstream from the vessel.

The temperature within the particle bed can be in a range from about −80° C. to about −120° C., or about −100° C. to about −135° C., or about −100° C. to about −145° C. The temperature of the particle bed is provided by the in-bed heat exchanger within the vessel. In a preferred embodiment, the particle bed has a temperature below the frost point or dew point of the condensable vapor within the process stream. In one embodiment, the temperature of the particle bed is 30° C. to 40° C. degrees below the dew point or frost point, or 40° C. to 55° C. degrees below the frost point or dew point or 40° C. to 65° C. degrees below the frost point or dew point The process stream is injected into the vessel through a distribution apparatus and caused to flow through the particle bed under conditions that cause condensation of the condensable vapors. As the process stream flows through the particle bed, the temperature of the process stream drops below the dew point or frost point and the condensable vapors condense on the solid particles of the bed. The condensed vapors are separated from gases in the process stream that have a condensation point below that of the condensable vapors. As the condensable vapors condense on the particles of the bed, the condensable vapors are separated from the remaining gases in the process stream (e.g., nitrogen), thereby forming a light gas stream that exits the vessel through the light gas stream outlet.

This separation technique can advantageously be carried out in a continuous or semi-continuous process in which the condensable vapors are condensed on the particles of the bed. The condensed vapors add to the mass of the particles and therefore increase the volume of the bed. The volume of the particle bed in the operating state can be maintained within desired parameters by removing a portion of the particles through a solids outlet in the vessel. The solids can be removed using any technique such as a valve and/or an auger.

In one embodiment, the amount of solids removed during operation is less than about 15%, more specifically less than 6% of the gas mass flow rate. In any case, the solids removal should equal the amount of material condensing from the gas phase.

Solids can be removed from the vessel to maintain a desired particle size in the bed. In one embodiment, particles are removed from a bottom portion of the bed where larger particles tend to accumulate. Particles can be removed or introduced into the bed through a solids inlet and/or outlets in the vessel. In some embodiments, the addition of solids can be advantageous in order to add smaller particles to maintain a desired particle size distribution with the bed. In one embodiment, the median particle size can be maintained with a range from about 0.05 mm and about 20 mm, more specifically about 0.1 mm and about 10 mm, and even more specifically about 0.2 mm to about 1 mm.

In one embodiment, the bed is operated as a fluidized bed. A fluidized bed can be provided by selecting the particle size of the bed particles and the mass flow of the process stream being injected into the vessel. At sufficiently high mass flow, the bed is fluidized. Fluidization of the bed causes expansion of the bed during use. The greater the fluidization, the greater the volume occupied by the bed during use. In one embodiment, the increased bed volume for a fluidized bed can be greater than 20%, more specifically greater than about 30%.

In one embodiment, the bed of particles is fluidized. The fluidized particles can impinge the exterior surface of the conduit of the heat exchanger and remove buildup of condensed solids from the exterior of the conduit. Removing the buildup of condensed solids from the conduit can cause the formation of new smaller particles and/or increase the size of particles within the bed. The impingement of the particles can be selected to minimize wear on the conduit while removing sufficient condensed solids to maximize heat transfer through the wall of the conduit.

The force of the impingement in a fluidized bed can depend on the mass flow rate of the fluidizing gasses, but can also depend on the size of the particles in the bed and/or the height at which the conduit traverses the bed. In one embodiment, fluidization can be achieved by using a bed with particle sizes in a range from about 0.05 mm to about 20 mm or in a range from about 0.1 mm to about 10 mm, or about 0.2 mm to about 1 mm. In one embodiment, the conduit can be placed in the bottom half of the bed of particles or in the bottom third of the bed so as to provide contact with larger particles. Placing the conduit of the heat exchanger in the proximity of larger particles tends to increase the force of impingement of the particles for a given flow rate of fluidizing gas.

In one embodiment, the method includes operating the separation unit in a steady state in which a rate of buildup of condensed solid on the exterior of the conduit of the in-bed heat exchanger is about the same as a rate of removal of condensed solids therefrom as a result of the impingement of the particles of the fluidized bed. In one embodiment, the removal of condensed vapors from the conduit is sufficient to allow continuous operation of the vessel for at least days, weeks, or even months without melting condensed solids on the exterior of the conduits.

In a preferred embodiment, the separation unit is operated economically by recovering a portion of the energy used to cool the process stream upstream from the vessel. In this embodiment, the process stream upstream from the vessel is cooled using a recuperative heat exchanger that is cooled using the separated light gas stream as the coolant.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for separating condensable vapors from gases to form a solid, comprising:
    passing a process stream that includes carbon dioxide through a bed of particles, the bed of particles comprising solid particles that consist essentially of solid carbon dioxide;
    cooling the bed of particles by one or more conduits of an in-bed heat exchanger at least partially submerged in the bed of particles to a temperature that causes gaseous carbon dioxide to desublimate into solid carbon dioxide;
    desublimating at least a portion of the condensable vapors onto the bed of particles and/or onto an exterior of the one or more conduits of the in-bed heat exchanger so as to form a condensed solid comprising solid carbon dioxide and a light gas stream; and
    separating the condensed solid comprising solid carbon dioxide from the light gas stream.

2. A method as in claim 1, the process stream comprising gaseous carbon dioxide.

3. A method as in claim 1, a pressure within the bed of particles being in a range from about atmospheric pressure to about 15 psi.

4. A method as in claim 1, a pressure within the bed of particles being in a range from about atmospheric pressure to about 5 psi.

5. A method as in claim 1, a temperature within the bed of particles being less than about $-78°$ C.

6. A method as in claim 1, the bed of particles including particles having an average particle size in a range from about 0.05 mm to about 20 mm.

7. A method as in claim 1, the bed of particles including particles having an average particle size in a range from about 0.1 mm to about 10 mm.

8. A method as in claim 1, further comprising expanding and thereby cooling the separated light gas stream downstream from the bed of particles and using the cooled, separated light gas stream as a coolant in the in-bed heat exchanger.

9. A method as in claim 1, further comprising cooling the process stream upstream from the bed of particles using one or more up-stream heat exchangers.

10. A method as in claim 9, the one or more up-stream heat exchangers comprising a recuperative heat exchanger that cools the processes stream using at least a portion of the separated light gas stream.

11. A method as in claim 1, the method comprising passing the process stream through an inlet of a separation vessel containing the bed of particles, removing the light gas stream through a light gas outlet of the separation vessel, and separately removing the condensed solid comprising carbon dioxide through a solids outlet of the separation vessel.

12. A method as in claim 1, wherein the one or more conduits of the in-bed heat exchanger are positioned horizontally relative to one another.

13. A method as in claim 1, wherein the one or more conduits of the in-bed heat exchanger are positioned vertically relative to one another.

14. A method as in claim 1, further comprising fluidizing the bed of particles by the process stream as the process stream passes upwardly through the bed of particles.

15. A method as in claim 14, wherein impingement of fluidized particles on the exterior of the one or more conduits removes at least a portion of condensed solid buildup from the exterior of the one or more conduits.

16. A method as in claim 15, wherein the process is performed at a steady state in which a rate of buildup of condensed solid on the exterior of the one or more conduits is approximately the same as a rate of removal of condensed solids therefrom by impingement of the fluidized particles on the exterior of the one or more conduits.

17. A method as in claim 1, the bed of particles including particles having an average particle size in a range from about 0.2 mm to about 1 mm.

18. A method for separating condensable vapors from gases to form a solid, comprising:
    passing a process stream comprising flue gas containing condensable vapors through a process stream inlet of a separation vessel and through a bed of particles contained within the separation vessel, wherein the bed of particles comprises solid particles consisting essentially of at least one of sulfur dioxide, sulfur trioxide, carbon dioxide, water, nitrogen dioxide, or nitric oxide;
    cooling the bed of particles by one or more conduits of an in-bed heat exchanger at least partially submerged in the bed of particles to a temperature that causes at least one of sulfur dioxide, sulfur trioxide, carbon dioxide, water, nitrogen dioxide, or nitric oxide to form a solid;
    desublimating at least a portion of the condensable vapors from the flue gas onto the bed of particles and/or onto an exterior of the one or more conduits of the in-bed heat exchanger so as to form a condensed solid and a separated light gas stream, the condensed solid comprising at least one of sulfur dioxide, sulfur trioxide, carbon dioxide, water, nitrogen dioxide, or nitric oxide;
    removing the separated light gas stream from the separation vessel through a light gas outlet of the separation vessel; and
    separately removing the condensed solid from the separation vessel through a solids outlet of the separation vessel.

19. A method as in claim 18, further comprising cooling the process stream that includes condensable vapors using one or more up-stream heat exchangers prior to passing the process stream through a process stream inlet of a separation vessel.

20. A method as in claim 18, wherein removing the condensed solid from the separation vessel through a solids outlet of the separation vessel includes using an auger to remove the condensed solid.

21. A method for separating carbon dioxide from gases to form a solid, comprising:
    passing a gas stream that includes condensable carbon dioxide through a bed of particles, the bed of particles comprising solid particles that consist essentially of solid carbon dioxide;
    cooling the bed of particles by one or more conduits of an in-bed heat exchanger at least partially submerged in the bed of particles to a temperature that causes gaseous carbon dioxide to desublimate into solid carbon dioxide;
    desublimating at least a portion of the carbon dioxide onto the bed of particles and/or onto an exterior of the one or more conduits of the in-bed heat exchanger so as to form a condensed solid comprising solid carbon dioxide and a light gas stream; and
    separating the condensed solid comprising solid carbon dioxide from the light gas stream.

22. A method as in claim 21, the method comprising passing the gas stream through an inlet of a separation vessel containing the bed of particles, removing the light gas stream through a light gas outlet of the separation vessel, and separately removing the condensed solid comprising solid carbon dioxide through a solids outlet of the separation vessel.

* * * * *

UNITED STATES PATENT AND TRADEMARK OFFICE
CERTIFICATE OF CORRECTION

PATENT NO. : 9,250,012 B2  
APPLICATION NO. : 14/204882  
DATED : February 2, 2016  
INVENTOR(S) : Baxter Page 1 of 1

It is certified that error appears in the above-identified patent and that said Letters Patent is hereby corrected as shown below:

In the Specification

Column 5
Line 51, change "exists" to --exist--

Column 8
Line 8, change "performing perform the" to --performing the--
Line 15 and after, change all instances of "16" to --116--
Line 38 and after, change all instances of "18" to --118--

Column 11
Line 64, change "due" to --dew--

Signed and Sealed this
Second Day of August, 2016

Michelle K. Lee
*Director of the United States Patent and Trademark Office*